United States Patent [19]

Eguchi

[11] Patent Number: 4,502,115
[45] Date of Patent: Feb. 26, 1985

[54] DATA PROCESSING UNIT OF A MICROPROGRAM CONTROL SYSTEM FOR VARIABLE LENGTH DATA

[75] Inventor: Kazutoshi Eguchi, Tokyo, Japan

[73] Assignee: Tokyo Shibaura Denki Kabushiki Kaisha, Kawasaki, Japan

[21] Appl. No.: 421,310

[22] Filed: Sep. 22, 1982

[30] Foreign Application Priority Data

Sep. 30, 1981 [JP] Japan .............................. 56-155188

[51] Int. Cl.³ .............................................. G06F 9/22
[52] U.S. Cl. ................................................... 364/200
[58] Field of Search ... 364/200 MS File, 900 MS File

[56] References Cited

U.S. PATENT DOCUMENTS 3,720,920 3/1973 Watson et al. ...................... 364/200

Primary Examiner—Raulfe B. Zache
Attorney, Agent, or Firm—Kenyon & Kenyon

[57] ABSTRACT

The invention provides a data processing unit of a microprogram control system which transfers variable length data from one memory area to another memory area of a main memory. The data processing unit has a data length storage register for storing the length of the variable length data, an address boundary data register for storing address boundary data of a write address of the main memory for storing the variable length data, a ROM for reading out data indicating the type of memory write operation on the basis of the data length and address boundary data, another ROM for reading out data for calculating the next memory address in accordance with the type of memory write operation (full-word, half-word, and byte word), a register control section for outputting the variable length data during a write operation in accordance with the type of memory write operation in a predetermined byte position or positions, an operation control section for calculating a memory address for the next memory access on the basis of the previous memory access and storing the memory address to the memory address register, data buses for storing write data output at the predetermined byte position or positions in the memory data register, and a memory control section for writing data of the specified data length into the main memory.

12 Claims, 11 Drawing Figures

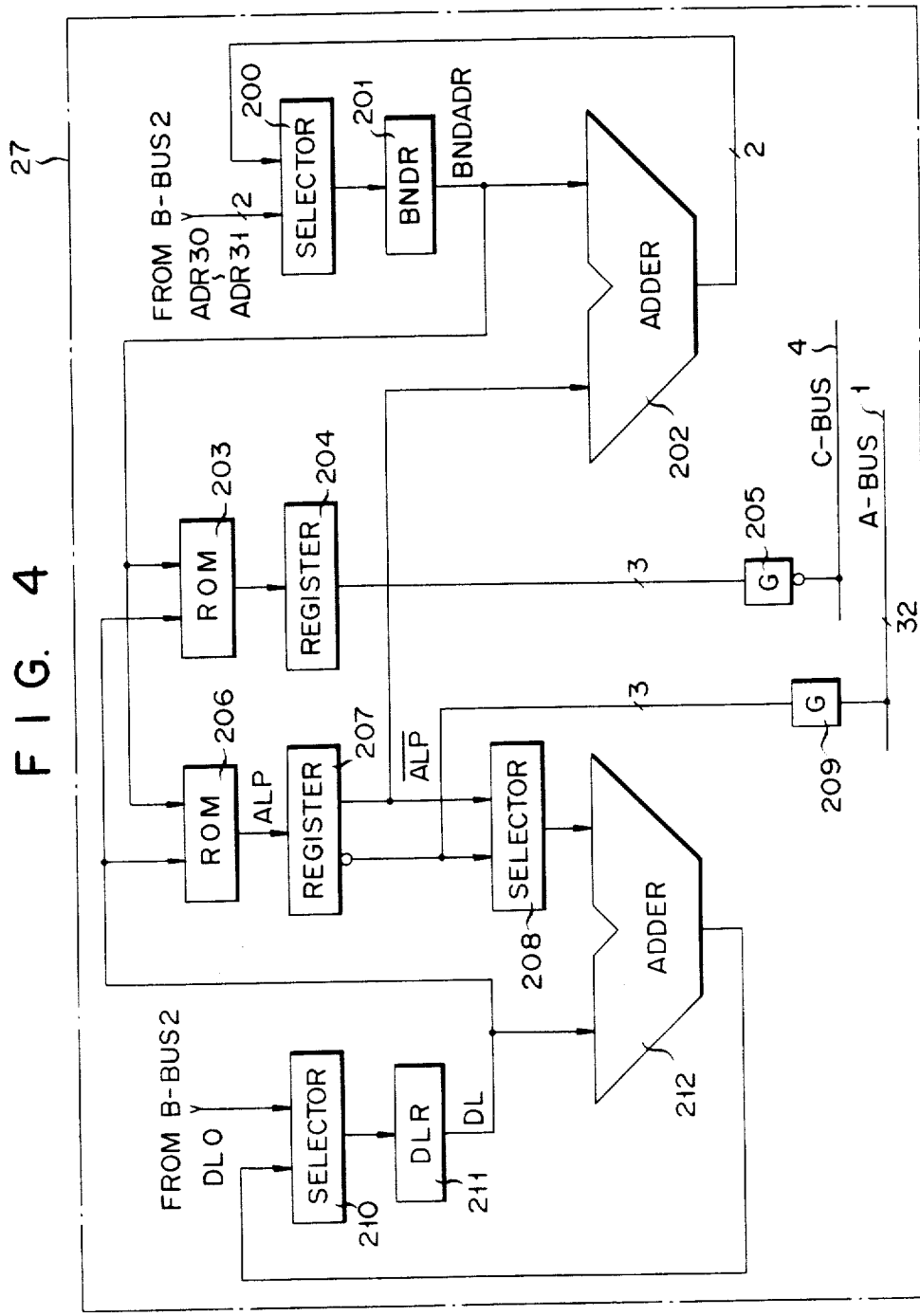

DATA PROCESSING UNIT OF A MICROPROGRAM CONTROL SYSTEM FOR VARIABLE LENGTH DATA

BACKGROUND OF THE INVENTION

The present invention relates to a data processing unit of a microprogram control system which deals with variable length data.

In a data processing unit of a microprogram control system, a data string of a given data length (variable length) stored in a memory area of the main memory may occasionally be required to be transferred to another memory area thereof. In this case, in a data processing unit where the length of the data string or an address of the main memory at which the data string is stored is designated in units of one byte, data to be processed is generally read/written in units of one byte. Therefore, the number of memory access operations for processing the accessed data string of a given length is increased thereby, decreasing processing speed.

SUMMARY OF THE INVENTION

The present invention has been made to eliminate the above drawback, and has the object of providing a data processing unit which performs read/write operations to transfer a data string in the main memory to a given memory area so as to execute proper memory access selected from among full-word access, half-word access and byte access, and based on address boundary data (full-word boundary, half-word boundary, byte boundary) of the main memory which stores the data string, whereby the number of memory access operations is decreased and data processing speed is increased.

In order to achieve the above object of the present invention, there is provided a data processing unit for transferring variable length data stored in a memory area of a main memory to another memory area of said main memory, comprising:

a memory address register for holding a write address and a read address for specifying said main memory;

a memory data register for holding write data into and read data from said main memory;

a data buffer for storing the variable length data which is read out from said main memory through said memory data register;

register controlling means for arraying data read out from said data buffer in units of one byte in accordance with byte write, half-word write and full-word write;

a result register for temporarily holding the data which is read out from said data buffer and arrayed by said register controlling means and for supplying the data to said memory data register;

access type deciding means for receiving, as input data, the number of bytes of the variable length data and lower two bits of a start write address set in said memory address register, and for producing the number of write bytes and a command which indicates one type of write operation from among byte write, half-word write and full-word write in accordance with the input data;

memory controlling means for writing the data arrayed in said result register into address of said main memory specified by said memory address register in accordance with the command indicating the write operation produced by said access type deciding means; and memory address updating means for adding the number of write bytes produced by said access type determining means and the memory address set in said memory address register, and for setting an updated memory address in said memory address register for a next memory access.

BRIEF DESCRIPTION OF THE DRAWINGS

Other objects and features of the present invention will be apparent from the following description taken in connection with the accompanying drawings in which:

FIG. 4 is a detailed block diagram showing the overall arrangement of a section 27 for determining the type of access, the section being included in the data processing unit shown in FIG. 1;

DETAILED DESCRIPTION OF THE PREFERRED EMBODIMENT

Figure 1:
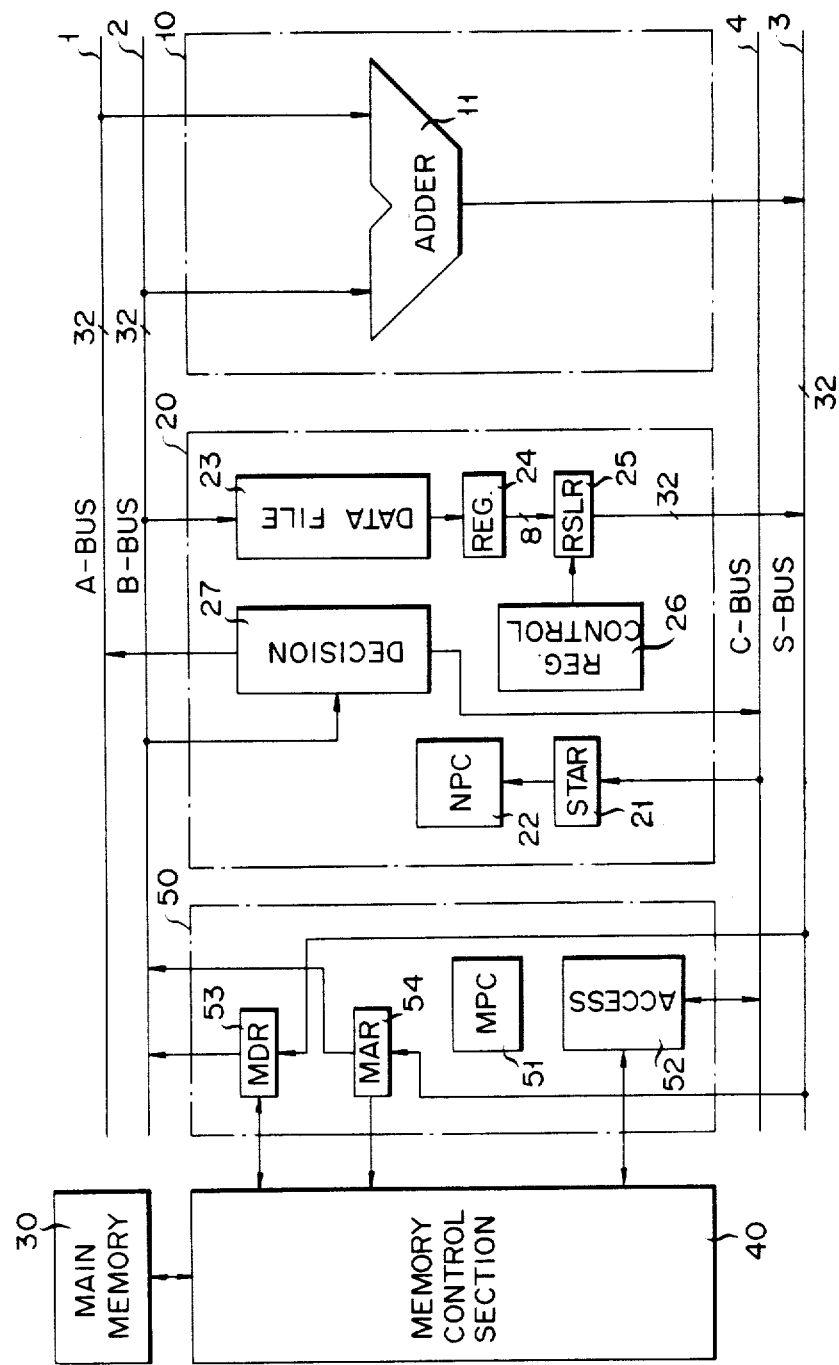
FIG. 1 is a block diagram of an embodiment of the present invention showing an entire construction of a data processing unit.

FIG. 1 shows a data processing unit of a microprogram control system according to one embodiment of the present invention. The data processing unit has data buses 1 and 2 (to be referred to as an A-bus 1 and a B-bus 2 hereinafter) through which data to be operated upon is mainly exchanged, a data bus 3 (to be referred to as an S-bus 3 hereinafter) through which operation results are mainly exchanged, a control bus 4 (to be referred to as a C-BUS 4 hereinafter) through which various control signals are exchanged, an operation control section 10 for arithmetic operations in decimal notation, a data processing section 20, a main control section 50, a main memory 30 and a memory control section 40. The operation control section 10, the main control section 40 and the main control section 50 constitute the main processing section. The operation control section 10 has an adder 11, the input terminals of which are connected to the A-BUS 1 and the B-BUS 2, and the output terminal of which is connected to the S-BUS 3. The data processing section 20 comprises: a start register 21 (to be referred to as a STAR 21 hereinafter) whose input terminal is connected to the C-BUS 4 and which stores a start microinstruction for designating the processing operation of the data processing section 20; a nanoprogram control section 22 (to be referred to as an NPC 22 hereinafter) which is connected to the STAR 21 to execute the microinstruction stored in the STAR 21 and to control each section of the data processing section 20; a data file 23 whose input terminal is connected to the B-BUS 2 and which stores data to be processed; a register 24 whose input terminal is connected to the output terminal of the data file 23 and which stores data read out in units of one byte from the data file 23; a processing result storing register 25 (to be referred to as an RSLR 25 hereinafter) whose input terminal is connected to the output terminal of the register 24, whose output terminal is connected to the S-BUS 3 and which stores data of 4 bytes at maximum (full-word); a register control section 26 whose output terminal is connected to the RSLR 25 and which controls storage of data from the register 24 in a desired byte position of the RSLR 25 in accordance with the type of memory write (full-word write, half-word write, and byte write); and a decision section 27 for determining the type of access (to be referred to as a section 27 for brevity hereinafter). The main control section 50 comprises: a microprogram control section 51 (to be referred to as an MPC hereinafter); an access instructing section 52 which is connected to the memory control section 40 and to the C-BUS 4 and which permits memory access by memory control section 40 in accordance with a command from MPC 51 and data on the C-BUS4; a memory data register 53 (to be referred to as an MDR 53 hereinafter) which is connected to the B-BUS 2, the S-BUS 3 and the memory control section 40 and which stores read data from the main memory 30 and write data into the main memory 30; and a memory address register 54 (to be referred to as an MAR 54 hereinafter) which is connected to the B-BUS 2, the S-BUS 3 and the memory control section 40, and which stores memory addresses of the main memory 30.

Figure 2:
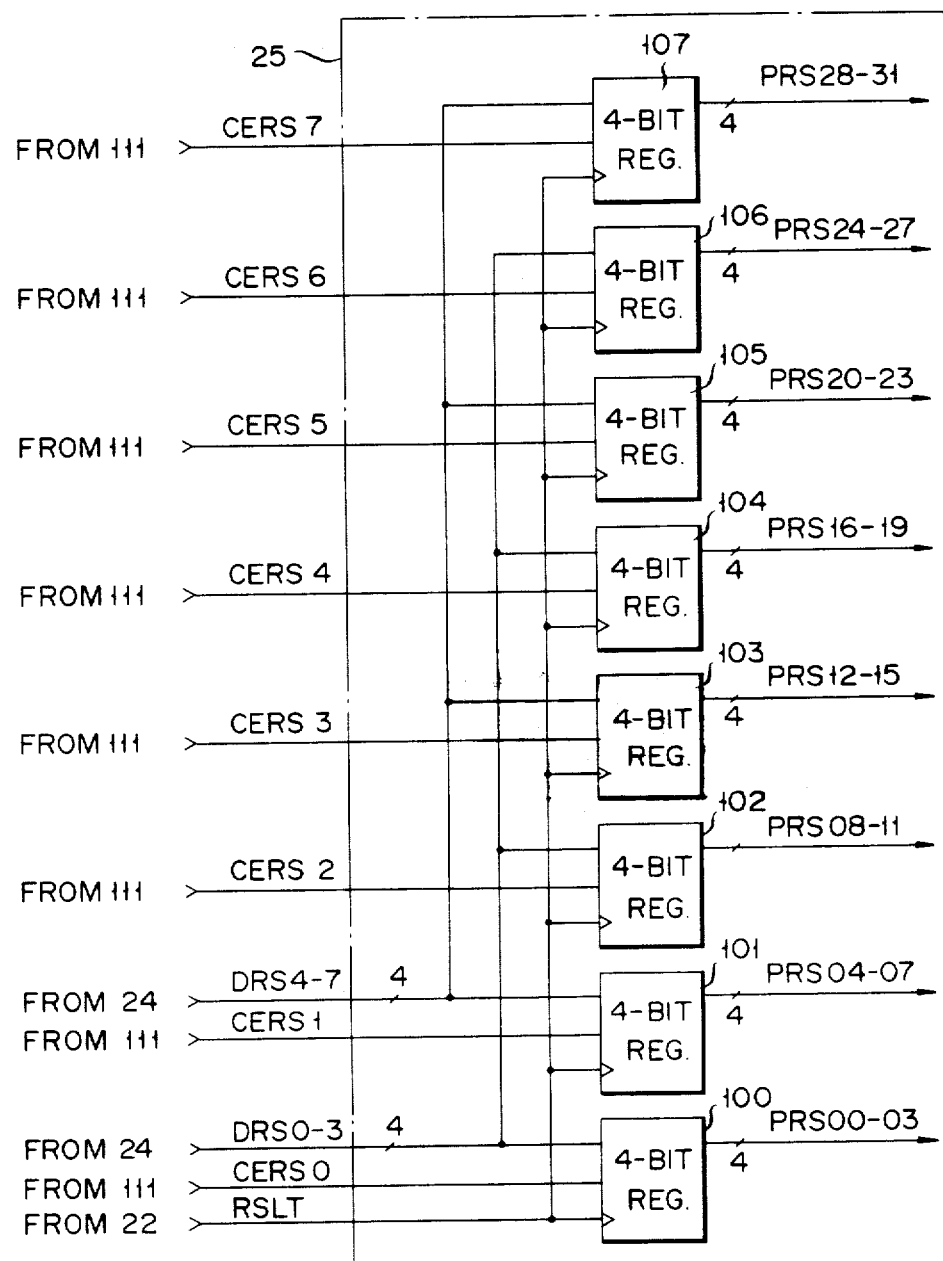
FIG. 2 shows the detailed arrangement of a processing result storing register 25 (RSLR) of the data processing unit shown in FIG. 1.

FIG. 2 shows the arrangement of the RSLR 25. The RSLR 25 comprises eight 4-bit registers 100 to 107. Upper 4-bit data (DRS0 to DRS3) of one-byte output data (DRS0 through DRS7) from the register 24, is stored in the registers 100, 102, 104 and 106. Lower 4-bit data (DRS4 to DRS7) of one-byte output data (DRS0 through DRS7) of the register 24, are stored in the registers 101, 103, 105 and 107. Enabling signals CERS0 to CERS7 (logic "1" signals output from ROM 111 in FIG. 3) are supplied from the register control section 26 to the registers 100 to 107. These signals are active high. If the enabling signals CERS0 to CDRS7 corresponding respectively to the registers 100 to 107 are set to logic "1", 4-bit input data (DRS0 through DRS3 or DRS4 through DRS7) is latched in synchronism with a clock signal RSLT supplied by a clock oscillator (not shown) in the NPC 22. Outputs from the registers 100 and 101 correspond to 0th to 7th bits of 32-bit data on the S-BUS 3. Outputs from the registers 102 and 103 correspond to 8th to 15th bits of the 32-bit data, outputs from the registers 104 and 105 correspond to 16th to 23rd bits thereof, and outputs from the registers 106 and 107 correspond to 24th to 31st bits thereof.

Figure 3:
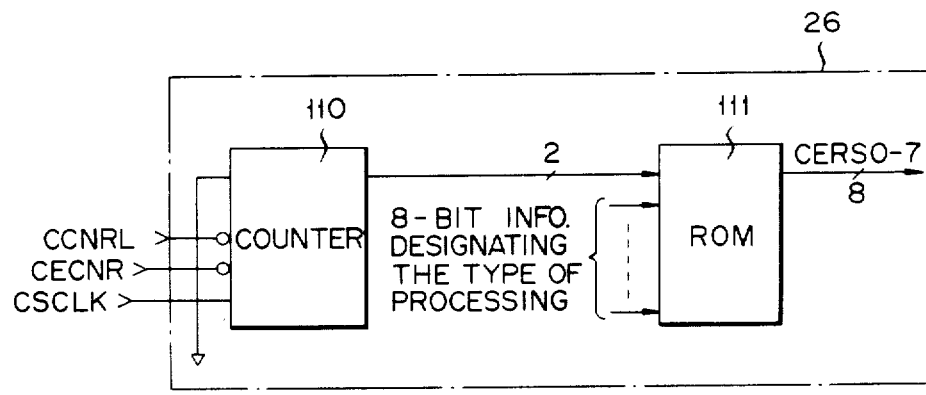
FIG. 3 is a detailed block diagram showing the overall arrangement of a register control section 26 of the data processing unit shown in FIG. 1.

FIG. 3 shows the overall arrangement of the register control section 26 shown in FIG. 1. A counter 110 up-counts in synchronism with a clock signal CSCLK during which the counter 110 receives an enabling signal CECNR of logic "1". All "0" data is loaded on the counter 110 in response to a load signal CCNRL of logic "1". A ROM 111 has address data which comprises 2-bit count signal output from the counter 110 (when the output of the counter 110 is 3 or more bits, lower 2-bit data is used) and 8-bit data which indicates the type of memory access specified by the start microinstruction. Eight-bit data read out from the ROM 111 is read out as the enabling signals CERS0 to CERS7 which are supplied to the registers 100 to 107. The enabling signal CECNR, the load signal CCNRL and the clock signal CSCLK are generated by a circuit (not shown) in the NPC 22.

FIG. 4 shows the overall arrangement of the decision section 27 shown in FIG. 1. A selector 200 selects the output signal from an adder 202 of the later stage or 2-bit data on the B-BUS 2. The 2-bit data on the B-BUS 2 corresponds to the lower 2-bits ADR 30 to ADR 31 of the memory address in the memory area to be accessed first in the main memory 30 for the data transfer. The selection output from the selector 200 is stored in an address boundary data register 201 (to be referred to as a BNDR 201 hereinafter). An output data BNDADR from the BNDR 201 is added to an output data from a register 207 by an adder 202. The adder 202 calculates boundary data (address boundary data) of the memory address to be accessed, that is, the lower 2-bits of the memory address. An output data BNDADR (address boundry data) of the BNDR 201 and an output data DL (data length) from a DLR 211 are supplied as an ROM address to a ROM 203. The ROM 203 produces a command which indicates the type of memory access (full-word access FW, half-word access HW, or byte access BW) pre-stored in the specified location and a return signal (R), when the ROM 203 receives the ROM address. Output data of the ROM 203 is stored in a register 204. An output from the register 204 appears on a specific line of the C-BUS 4 through an output gate 205 (to be referred to as a G 205 hereinafter). Sum data of the output data BNDADR from the BNDR 201 and the output data DL from the DLR 211 is supplied as a ROM address to a ROM 206 in the same manner as in the ROM 203. When the ROM 206 receives the ROM address, numerical data ALP is read out therefrom to compute the next memory address prestored from a predetermined location. The numeric data ALP from the ROM 206 is hold in the register 207. According to the above embodiment, the address of the main memory is accessed in units of one byte and the numerical data ALP indicates the number of data bytes to be processed by one memory access. Therefore, in the above embodiment in which the data length is specified in units of one byte, the numerical data ALP also indicates the data length of the data to be processed by one memory write access. ROM outputs for the common ROM addresses of the ROMs 203 and 206 are summarized in the following table.

TABLE

| ROM ADDRESS | | ROM OUTPUT | |
|---|---|---|---|
| ROM 203, 206 | | ROM 203 | ROM 206 |
| BNDADR | DL | COMMAND | ALP |
| 00 | 0 | BW + R | 1 |
|  | 1 | HW + R | 2 |
|  | 2 | HW | 2 |
|  | 3 | FW + R | 4 |
|  | 4 or more | FW | 4 |
| 01 | 0 | BW + R | 1 |
|  | 1 or more | BW | 1 |
| 10 | 0 | BW + R | 1 |
|  | 1 | HW + R | 2 |
|  | 2 or more | HW | 2 |
| 11 | 0 | BW + R | 1 |
|  | 1 or more | BW | 1 |

In the table, reference symbol BW (byte word) denotes a byte (1 byte) access; FW (full-word), a full-word (4 byte) access; and HF (half-word), a half-word (2 byte) access. Further, reference numeral R denotes an output which corresponds to the return signal CERTN and which is produced by the decision section 27. Note that the output or data length DL is counted from the 0th byte. Therefore, the byte length of data to be processed is actually DL+1. A selector 208 selects the output data (ALP) from the register 207 and inverted output data $\overline{ALP}$ (complement data) from the register 207. The inverted output data $\overline{ALP}$ from the register 207 appears on the A-BUS 1 through an output gate G 209. A selector 210 selects output data from an adder 212 or data DL0 on the B-BUS 2. The data DL0 on the B-BUS 2 corresponds to a data length of the data transfer string. The output data from the selector 210 is stored in the data length register 211 (to be referred to as a DLR 211 hereinafter). The output data DL from the DLR 211 is added to the output data from the selector 208 by the adder 212 so as to calculate the data length of data to be processed.

Figure 5A:
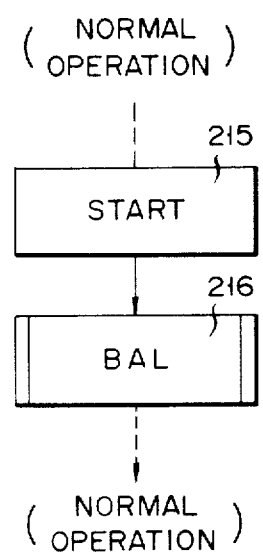
FIGS. 5A and 5B are flowcharts for explaining the processing steps of data transfer of the data processing unit shown in FIG. 1.
Figure 7:
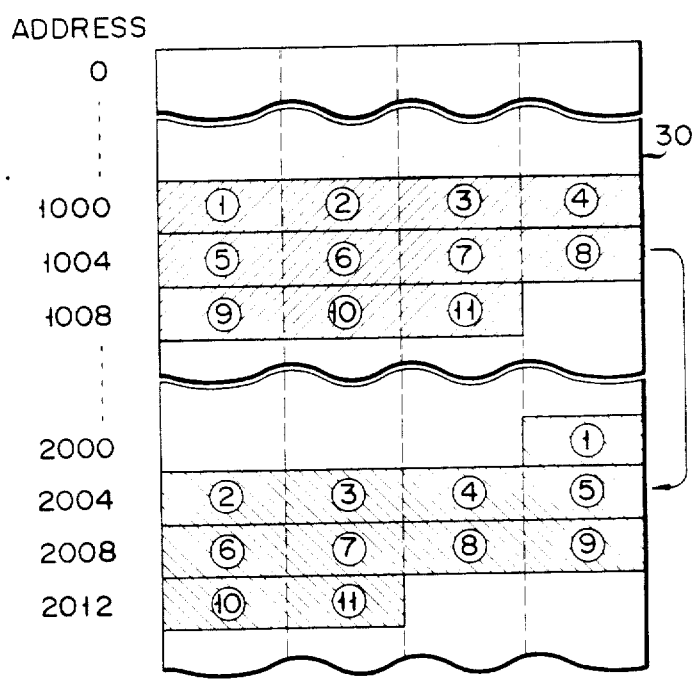
FIG. 7 shows an example of data written in the main memory in the data transfer operation of the present invention.

Now the mode of operation of the data processing unit according to one embodiment of the present invention will be described. In FIG. 7 data of 11 bytes (DL0="10") stored in a memory area, corresponding to addresses from address 1000 through address 1010 of the main memory 30, is transferred to another memory area of the main memory 30 corresponding to address 2003 through address 2013. The 11-byte data string read out from the address 1000 of the main memory 30 is supposed to be stored in the data file 23. Data of the data length DL0 (DL0="10" (decimal)) of the data string and data of the lower 2 bits (in this case, "11") of the write start address (address 2003) of the data string are supplied from the main control section 50 to the decision section 27 of the data processing section 20 through the B-BUS 2, and DL0="10" (decimal) are held, as shown in FIG. 4 in the DLR 211 through the selectors 210 and 200, and the lower 2-bit data (binary) is held in the BNDR 201. In this condition, as shown in the steps of the microprogram in FIG. 5A, the MPC 51 executes a start microinstruction (START). The start microinstruction (START) is stored in the STAR 21 of the data processing section 20 under the control of the MPC 51, so that the data processing section 20 starts the nanoprogram operation (Step 215). The NPC 22 executes the nanoprogram corresponding to start microinstruction held in the STAR 21. The microprogram of the MPC 51 is branched into a processing routine which is executed by a branch and link (BAL) instruction (Step 216).

Meanwhile, a necessary data string stored in the data file 23 is transferred in accordance with the control of the NPC 22 to the necessary byte position of the RSLR 25 of the data processing section 20 under the control of the register control section 26.

The mode of operation of the register control section 26 will be described below.

In the data processing section 20, data is processed in units of one byte. The data string stored in the data file 23 is read out in units of one byte and is sequentially supplied to the register 24. The stored data string in the register 24 is then stored in the necessary byte position of the RSLR 25 under the control of the register control section 26. That is, the array processing is performed within the RSLR 25 in order to write data into the main memory 30 using one of the byte access, half-word access and full-word access. Under the control of the NPC 22, the register control section 26 controls the data arrangement in the RSLR 25 in accordance with the type of memory write (byte, half-word, and full-word) and the type of memory access specified by the start microinstruction START. In the register control section 26, the ROM 111 is addressed by the sum data of the 2-bit signal from the counter 110 and the data indicating the type of memory access specified by the start microinstruction START and produces the enabling signals CERS0 to CERS7 from the corresponding address position. If all the enabling signals CERS0, CERS2, CERS4 and CERS6 which respectively correspond to the registers 100, 102, 104, and 106 of the RSLR 25 are set to logic "1", the upper 4 bits DRS0 to DRS3 of the output from the register 24 are latched in synchronism with the clock pulse RSLT. Similarly, if all the enabling signals CERS1, CERS3, CERS5 and CERS7 which respectively correspond to the registers 101, 103, 105 and 107 are set to the level "1", the lower 4 bits DRS4 to DRS7 of the output from the register 24 are latched in synchronism with the clock pulse RSLT.

The operation of the register control section 26 for one main memory write varies in accordance with the type of memory write. If byte write is performed, the register control section 26 completes its operation when the two bits of the output signal from the counter 110 are set to "00". Similarly, if the two bits are set to "01", the register control section 26 completes half-word write; and if the two bits are set to "11", the register control section 26 completes full-word write. The counter 110 is controlled by the NPC 22. In its initial state, after all "0" data is loaded, the counter 110 is up-counted the desired number of times in synchronism with the clock signal CSCLK in accordance with the type of memory write. Further, when byte write is performed and data transfer in the main memory is specified, all the outputs CERS0 to CERS7 of the ROM 111 are set to logic "1". Thus, the outputs (1 byte each) from the register 24 are latched in all the registers 100 to 107. The same 1-byte data a are arrayed in four byte positions of the RSLR 25 with a 32-bit data area (FIG. 6A).

Half-word write and full-word write operations are described below. When the half-word write is performed, the 2 bits of the output from the counter 11 are "01", the register control section 26 completes its operation. If the 2 bits of the output from the counter 11 are set to "00", the data output from the ROM 111 is first stored in the RSLR 25 in the arrangement of byte-write as shown in FIG. 6A. When the 2 bits of the output from the counter 110 become "01", the ROM 111 outputs the logic "1" signals CERS2, CERS3, CERS6 and CERS7. Following the resultant data a, one-byte data b is latched in two byte positions: a byte position from 24th bit to 31st bits of the RSLR 25 and another byte position from 8th to 15th bits thereof. Therefore, the storage contents of the RSLR 25 are arranged by the same value in an upper half-word (2 bytes) and a half-word (2 bytes). In other words, the half-word comprises data a and data b. Meanwhile, if the full-word write is performed, the register control section 26 completes its operation when the 2 bits of the output from the counter 110 are set to "11". The storage contents of the RSLR 25, until the 2 bits of the output reach "01", becomes the arrangement in FIG. 6B through the arrangement in FIG. 6A. When the lower two bits of the output from the counter 110 are set to "10", only the enabling signals CERS4 and CERS5 from the ROM 110 are set to logic "1". As a result, following the data b, one-byte data c read out from the data file 23 and stored in the register 24 is latched in the byte-position from 16th to 23rd bits of the RSLR 25 (FIG. 6C). Further, when the lower two bits of the output from the counter 110 are set to "11", the output state from the ROM 111 is changed; only the enabling signals CERS6 and CERS7 are set to logic "1". One-byte data d from the register file 24 following the data c are latched in the byte position from 24th bit to 31st bit of the RSLR 25. Therefore, in case of a full-word write the storage contents of the RSLR 25 correspond to data of 4 bytes (full-word) which are arrayed by data a through data d. In this embodiment, if the byte write is performed, arbitrary one-byte data in the four byte positions of the RSLR 25 in FIG. 6A is used as write data to the main memory 30. If the half-word write is performed, the upper or lower 2-byte data in the RSLR 25 shown in FIG. 6B is used as the write data. Further, if the full-word write is performed, all the 4-byte data is used per se as the write data. When the 11-byte data from the address 1000 through the address 1010 in the main memory 30 are transferred to the address 2003 through the address 2013, the BNDADR="11" and DL="10" (decimal) for the first data (1). Thus, as apparent from the above table, the command BW is read out from the ROM 203 and the numeric data ALP=1 is read out from the ROM 206.

Figure 5B:
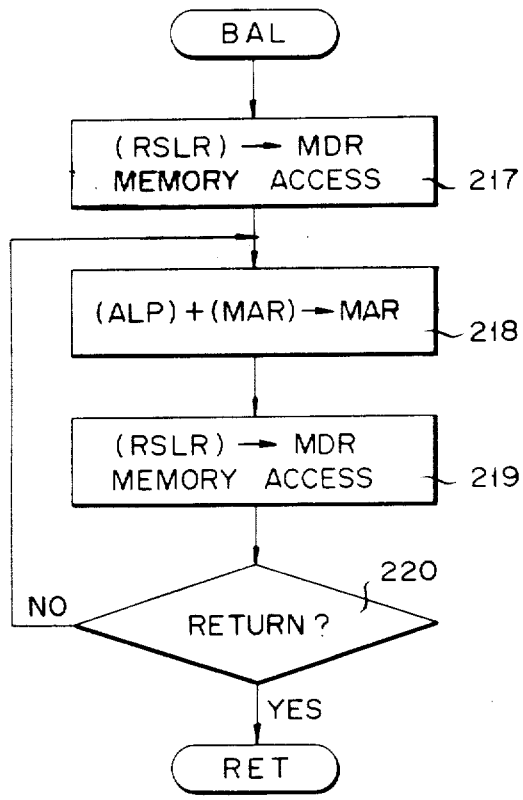
Figure 6A:
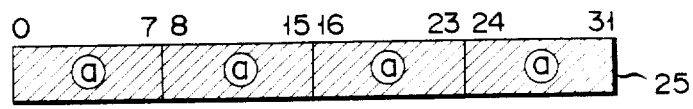
FIGS. 6A to 6D show examples of data assignment of the processing result storing register (RSLR) in accordance with a register control section 26.
Figure 6B:
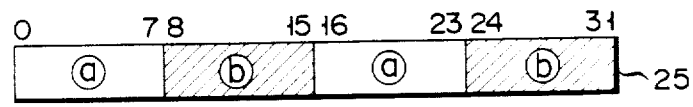
Figure 6C:
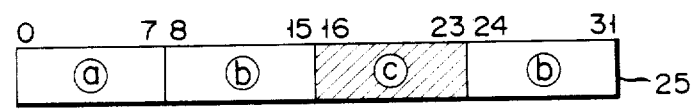

During the MPC 51 executes BAL operation, under the control of the register control section 26, after the one-byte data (1) to be written at address 2003 of the main memory 30 is stored in the RSLR 25 as shown in FIG. 6A the microprogram of MPC 51 advances to step 217 in FIG. 5B. In step 217, under the control of the MPC 51, the storage contents of the RSLR 25 are stored in the MDR 53 via the S-BUS 3. In this condition, a command (BW) indicating byte-access is produced from the ROM 206 in the decision section 27, and is supplied through the C-BUS 4 to the access permission section 52. A memory access instruction is supplied from the access permission section 52 to the memory control section 40. Under the control of the memory control section 40, the one-byte data (1) is written at address 2003 of the main memory 30 as shown in FIG. 7.

The mode of operation of the determining section 27 in FIG. 4 will be described in detail. The output data DL (in this case, DL=DL0="10" (decimal)) from the DLR 211 and the output data BNDADR (in this case, "11" binary) from the BNDR 201 are commonly supplied to the ROMs 203 and 206. The ROMs 203 and 206 produce numerical data ALP and a command shown in the above table respectively which correspond from an ROM address indicated by the sum of data DL and data BNDADR. In writing data in the address 2003 of the main memory 30, since BNDADR="11" and DL=10 (>1), as may be apparent from the above table, a BW (byte write) command and numerical data of ALP=1 (byte) are respectively produced from the ROM 203 and the ROM 206. For writing the data string of 11 bytes from the address 2003 of the main memory 30, the command indicates write of one-byte data by the first memory write as shown in data (1) in FIG. 7. The command (BW) indicating byte-write produced from the ROM 203 is stored in the register 204 and is supplied to the C-BUS 4 through the G 205. The numerical data ALP (in this case ALP=1) read out from the ROM 206 is first stored in the register 207 and is then directly supplied to the adder 202. The inverted output (complement data) of the storage contents of the register 207, that is, $\overline{ALP}$ is supplied to the adder 212 through the selector 208. Thus, the storage content of the register, that is, ALP is supplied to the adder 212 through the selector 208 in a case in which memory access is performed from the end address toward the start address. The adder 202 adds the output BNDADR from the BNDR 201 to the numerical data ALP. Data of the lower 2 bits (address boundary data) of the next memory address of the main memory 30 is then calculated by the adder 202. The output from the adder 202 is stored in the BNDR 201 through the selector 200. In this embodiment, the conditions BNDADR="11" and ALP=1 ("01" in the binary notation) are given and the lower 2 bits of the adding result in the adder 202 becomes "00". The updated contents of the BNDR 201, that is, the lower 2 bits of the memory address of the main memory 30 become "00", which is held in the BNOR 201. Further, the adder 212 adds the output DL of the DLR 211 to the numerical data $\overline{ALP}$. In other words, operation (DL-ALP) is performed to calculate the remaining data length of the non-updated data string to be processed. The output from the adder 212 is stored in the DLR 211 through the selector 210. Since the DL=10 and ALP=1 in this embodiment, the updated contents of the DLR 211, that is, the data length DL of the data string corresponds to 9 bytes. The data length is held in the DLR 211.

In step 217 (FIG. 5B), when memory access to the address 2003 of the main memory 30 is performed and a memory write of one-byte data is executed, the MPC 51 performs step 218. In step 218, the numeric data ALP is added to the contents of the MAR 54 and the adding result is stored in the MAR 54. That is, the content of the MAR 54 is updated in accordance with the data length of data written in the main memory 30 in step 217 so as to calculate the next memory address for memory write. Therefore, the inverted data $\overline{ALP}$ of the numerical data held in the register 207 is output onto the A-BUS 1 from the G 209.

Since the negative logic is used by the A-BUS 1 in this embodiment, the inverted data of the numerical data ALP is used. However, if a NAND gate such as the G 205 is used in place of the G 209, the numerical data ALP per se may be output on the A-BUS 1. In this case, the storage contents of the MAR 54 appear on the B-BUS 2. As a result, the numerical data ALP on the A-BUS 1 is added to the storage content (memory address MAR) on the B-BUS 2 by the adder 11 of the operation control section 10 under the control of the MPC 51. A memory address for the next memory access is thus calculated. Since the ALP is 1 and the content of the MAR 54 is the address 2003, address 2004 is obtained as an updated or next memory address. The output from the adder 11 is stored in the MAR 54 through the S-BUS 3. As a result, the content (memory address) of the MAR 54 is updated.

While address updating of the MAR 54 is executed in step 218, data to be written in the main memory 30 is read out from the data file 23 in the data processing section 20. In practice, this operation is executed from step 217. If the number of processing bytes is 2 bytes or less, the operation is terminated during step 217. In this embodiment the memory address is the address 2004 which corresponds to the lower 2 bit data BNDADR (address boundary data) from the BNOR 200 as "00", the non-updated data length DL from the DLR 211 corresponds to 9 bytes, as apparent from the TABLE the command FW is output from the ROM 203 and the numerical data ALP "4" is output from the ROM 206 so that a full-word is written. That is, write operation for the next 4-byte data in the address 2004 through the address 2007 is performed. By the register control section 26, different one-byte data, that is write data (2), (3), (4) and (5) (see FIG. 7) are stored in four byte positions of the RSLR 25.

When the operation in step 218 is completed, the MPC 51 executes step 219. In step 219, the storage contents of the RSLR 25 of the data processing section 20 are transferred to the MDR 53 through the S-SUB 3. At this time, the memory access command (FW) indicating the full-word write is supplied from the ROM 203 in the decision section 27 to the access instructing section 52 via the C-BUS 4. As a result, the memory access instruction is supplied from the access instructing section 52 to the memory control section 40. Thus, the memory access to the main memory 30 is performed under the control of the memory control section 40. Thus, under the control of the memory control section 40, 4-byte data is written from the addresses 2004 through 2007 of the main memory 30 by the second memory access (memory write access) operation as shown by data (2) through (5) in FIG. 7.

Figure 6D:
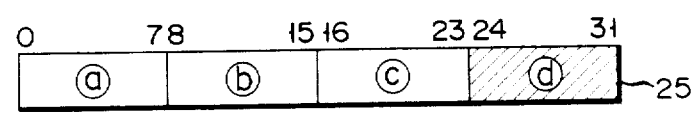

While the above memory access is being performed in step 219, the lower 2 bits (address boundary data) of the memory address of the main memory 30 to be accessed are calculated by the adder 202 in the decision section 27 of the data processing section 20 and the control of the NPC 22. In this case, the numerical data ALP="4" (decimal)="100" (binary) and BNDR 201="00" are given, so that the lower 2 bits of the adding result of the adder 202 are "00". The calculation result "00" is stored in the BNDR 201. Similarly, the adder 212 of the data processing section 20 calculates the length of the non-processed data immediately after the memory access is completed in step 219. The addition result of the adder 212 is 5 since DL=9 and $\overline{ALP}$=−4. This calculation result 5 is stored in the DLR 211. The ROMs 203 and 206 are addressed by the sum data of the output BNDADR from the BNDR 201 and the output DL from the DLR 201, to produce the numerical data ALP and the commands shown in the Table above from the addressed locations. If BNDADR="00" and DL=5, a command FW indicating the full-word write is read out from the ROM 203 and ALP=4 is read out from the ROM 206. These outputs from the ROMs 203 and 206 are respectively stored in the registers 204 and 207, and are used for the address calculation in step 218 and the command output in step 219. Further, in the data processing section 20, the next write data (6), (7), (8) and (9) (FIG. 7) to be written in the main memory 30 is read out from the data file 23 under the control of the NPC 22, and is stored in the RSLR 25 in the form of the data string shown in FIG. 6D. This third memory access is the full-word write as in the case of the second memory access. Therefore, the write data (6) through (9) of 4 bytes which is arrayed in the RSLR 25 is transferred to the main memory 30 through the S-BUS 3 and the MDR 53, as in the case of the second memory access. This data of 4 bytes is written from the address 208 to the address 2012 which are specified by the MAR 54.

When the memory access in step 219 is completed, the flow returns to step 218, and steps 218 and 219 are repeated until processing of the data of the specified length or number of bytes is completed. In the address updating operation in step 218, the adder 11 performs an addition of ALP+MAR to calculate the next memory address. In this case, ALP read out from the ROM 206 by the third memory access is 4, and the address stored in the MAR is the address 2008. The addition result (4+2008=2012) of the adder 11 is supplied to the MAR 54 through the S-BUS 3. The lower 2-bits "00" (binary notation) of the addition result (ALP+BNDADR; 4+0=4) of the adder 202 are stored in the BNDR 201. The addition result (DL+$\overline{ALP}$; 5−4=1) of the adder 212 is stored in the DLR 211. The ROM 203 is then addressed by the output DL=1 from the DLR 211 and the output BNDADR="00" from the BNDR 201. The command HW and the return signal R are then read out from the ROM 203, and ALP (2) is read out from the ROM 206. Parallel to the operation as described above, the next write data (10) and (11) is read out from the data file 23, and the register control section 26 arranges the data in the data string shown in FIG. 6B. In step 219 for the third time, the fourth memory access operation is performed. The data (10) and (11) of 2 bytes is half-word written at the addresses 2012 and 2013 of the main memory 30, as shown in FIG. 7. In this fourth write operation, the MPC 51 returns to the main routine in response to the return signal R from the ROM 203 of the decision section 27. The processing of the data processing section 20 is thus completed.

According to the data processing unit of the present invention, 1-byte processing, 2-byte processing and 4-byte processing can be performed by one memory access based on the logic which readily determines the type of memory access (byte access, half-word access and full-word access) to the main memory and on the logic which causes the number of byte data corresponding to the memory access to locate in a proper byte position, on the basis of the data length of the non-processed data and the lower 2 bits (address boundary data) of the memory address of the main memory to be accessed. The number of memory access operations can be significantly decreased, so that the data processing speed is increased.

Since determination of the type of memory access and assignment of a string of data are performed using a nanoprogram, the number of steps of the microprogram is decreased. Thus, further high speed data processing can be performed.

A logic is used wherein the microprogram is branched into a data processing subroutine by the BAL microinstruction, and termination of data processing is determined and the return signal R is produced based on the data length of the non-processed data and the lower 2 bits of the memory address accessed from the main memory 30. Therefore, the data processing speed is further increased as compared with the system in which the microprogram itself is used to determine the end of data processing.

Further, various types of data processings such as creation of a command indicating the type of memory access and assignment of the necessary number of data to necessary byte positions can be simultaneously performed in the data processing section 20, on the basis of the microinstruction stored in the start register (STAR) 21 even during a period in which addition control and memory access control for BAL operation and address updating are being performed by the microprogram control section (MPC). Accordingly, the data processing speed is further increased.

In the above embodiment, a logic is adopted which determines the end of data processing on the basis of the data length of the non-processed data and the lower 2 bits of the memory address of the main memory 30 to be accessed. However, the present invention is not limited to the above logic. The end of data processing may be determined by a microprogram. Further, in the above embodiment, various data processing such as creation of a command indicating the type of memory access and assignment of data in the desired byte position are performed under the control of the NPC 22 simultaneously when addition control operations for BAL operation and address updating are performed by the microprogram control section (MPC). However, the present invention is not limited to the parallel processing described above.

What is claimed is:

1. A data processing unit for transferring variable length data having a data length from one area of a main memory to another area of said main memory, comprising:
   a. a memory address register holding a write address and a read address of said main memory;
   b. a memory data register holding write data for and read data from said main memory;
   c. access type deciding means, receiving, as input data, the data length of the variable length data and a lower two bits of a start write address set in said memory address register, and producing a number of bytes to be written and a command which indicates a type of write operation from among byte write, half-word write and full-word write in accordance with the input data;
   d. a data buffer for storing the variable length data which is read out from said main memory, coupled to the output of said memory data register;
   e. a result register for temporarily holding data, the output of said result register being coupled to said memory data register;
   f. register controlling means for reading out and arraying a portion of the variable length data from said data buffer into said result register in units of one byte according to said command;
   g. memory controlling means for transferring said portion to said memory data register and for writing said portion from said memory data register starting at the write address of said main memory held by said memory address register in accordance with said command; and
   h. memory address updating means for adding the number of bytes to be written produced by said access type deciding means to the write address, and for setting an updated write address in said memory address register for a next memory access.

2. A unit according to claim 1, further comprising:
   a microprogram control section controlling said memory controlling means and said memory address updating means; and
   a nanoprogram control section which is started by a start microinstruction produced by said microprogram control section and which controls said data buffer, said register controlling means, said result register and said access type deciding means.

3. A unit according to claim 1, wherein said access type deciding means has first and second ROMs which are addressed in accordance with the input data supplied thereto, said first and second ROMs producing the command indicating the type of write operation and the number of bytes to be written, respectively, in accordance with the input data.

4. A unit according to claim 3, wherein said access type deciding means has:
   first adding means for adding the number of bytes to be written produced by said second ROM to the lower two bits of the write start address to calculate a lower two bits of the updated write address;
   a first register for holding said lower two bits output from from said first adding means;
   second adding means for adding the data length of the variable length data to a complement of the number of bytes to be written produced by said second ROM to calculate a number of remaining bytes of the variable length data;
   a second register for holding an addition result from said second adding means; and
   addressing means for repeatedly addressing said first and second ROMs in accordance with data from said first and second registers after a first addressing in accordance with the input data.

5. A unit according to claim 4, wherein said first ROM produces return data indicating completion of data processing in addition to the command indicating the type of write operation.

6. A unit according to claim 4, wherein next data arrayed in said result register is written in the updated write address of said main memory which is updated by said memory address updating means in accordance with the command indicating the type of write operation read out from said first ROM which is addressed in accordance with the input data produced by said first and second ROMs.

7. A unit according to claim 1, wherein said result register comprises
   a. an even number of 4-bit registers, said registers being numbered sequentially so that each has an even or an odd number associated with it, so that an upper four bits of a byte of data read out from said data buffer is supplied to said 4-bit registers of even numbers, and so that a lower four bits is supplied to said registers of odd numbers; and
   b. a data setting controlled by control signals to said registers said control signals being produced by said register control means.

8. A data processing unit for recursively transferring variable length data stored in a memory area of a main memory to another memory area of said main memory, comprising:
   a. a data processing section including:
      i a first register for storing a current address boundary of a current write address of said main memory, which write address specifies the beginning of a location where a portion of the variable length data is to be written;
      ii a second register for holding a current data length of the variable length data;
      iii means for determining a current type of write, electrically coupled to the outputs of said first and second registers, said determining being on the basis of said current data length and of said current address boundary and for determining an end of a write operation;
      iv output means, electrically coupled to the output of said deciding means, for reading out from said deciding means data for calculating a next write address to be used after said current type of write is executed;
      v means, for updating, electrically coupled to the inputs of said first and second registers and the output of said output means, for updating the contents of said first and second registers to a next address boundary of a next write address and a next data length of the variable length data, on the basis of said data for calculating the next write address; and vi means for arraying said portion in a manner appropriate to said current type of write; and b. a main processing section for writing into said main memory said portion including i a memory address register holding said current write address;

ii a memory data register holding said portion;

iii means for transferring said portion from the arraying means to said memory data register;

vi means for writing said portion from said memory data register to the main memory using said current write address held in said memory address register;

iv means, electrically coupled to the output means, for calculating a next write address on the basis of said data for calculating a next write address, and on the basis of said current write address.

9. A method for successively choosing types of memory access in connection with the transfer of a variable length data string from one area of a computer memory to another area of a computer memory comprising:

a. defining as a current address boundary for a memory access the last two bits of an initial start address;

b. establishing as a current data length the length of the variable length data string;

c. determining a current type of memory access, from amongst the group of byte access, half-word access, and full-word access, on the basis of said current data length and said current address boundary;

d. performing a memory access of said current type of memory access;

e. adding a number of bytes in said current type of memory access to said current address boundary;

f. subtracting said number of bytes in said current type of memory access from said current data length;

g. repeating steps c through f until a next data length will be zero after said current type of memory access.

10. A method as claimed in claim 9 wherein step c comprises:

addressing a ROM, programmed to provide at its output a signal indicative of one of said types of memory access, with said current data length and said current address boundary.

11. A method as claimed in claim 9 wherein step e comprises;

i addressing a ROM, programmed to provide at its output a number of bytes to be accessed by said current type of memory access with said current data length and said current address boundary;

ii outputting a number of bytes to be accessed to a register from the ROM;

iii outputting the number of bytes to be accessed to an adder from the register;

iv inputting the current address boundary to the adder; and v adding the number of bytes to be accessed to the current address boundary by means of the adder so that only the last two bits of the sum are retained.

12. A method as claimed in claim 9 wherein step e comprises;

i addressing a ROM, programmed to provide at its output a number of bytes to be accessed by the current type of memory access, with said current data length and said current address boundary;

ii outputting the number of bytes to be accessed to a register from the ROM, the register being able to output the complement of the number of bytes to be accessed;

iii outputting the complement of the number of bytes to be accessed to an adder from the register;

iv inputting the current data length to the adder; and v adding the complement of the number of bytes to be accessed to the current start address by means of the adder.

* * * * *